Sept. 16, 1941.　　　　J. SCHUNK　　　　2,255,822
CURTAIN FIXTURE
Filed April 16, 1940　　　3 Sheets-Sheet 1
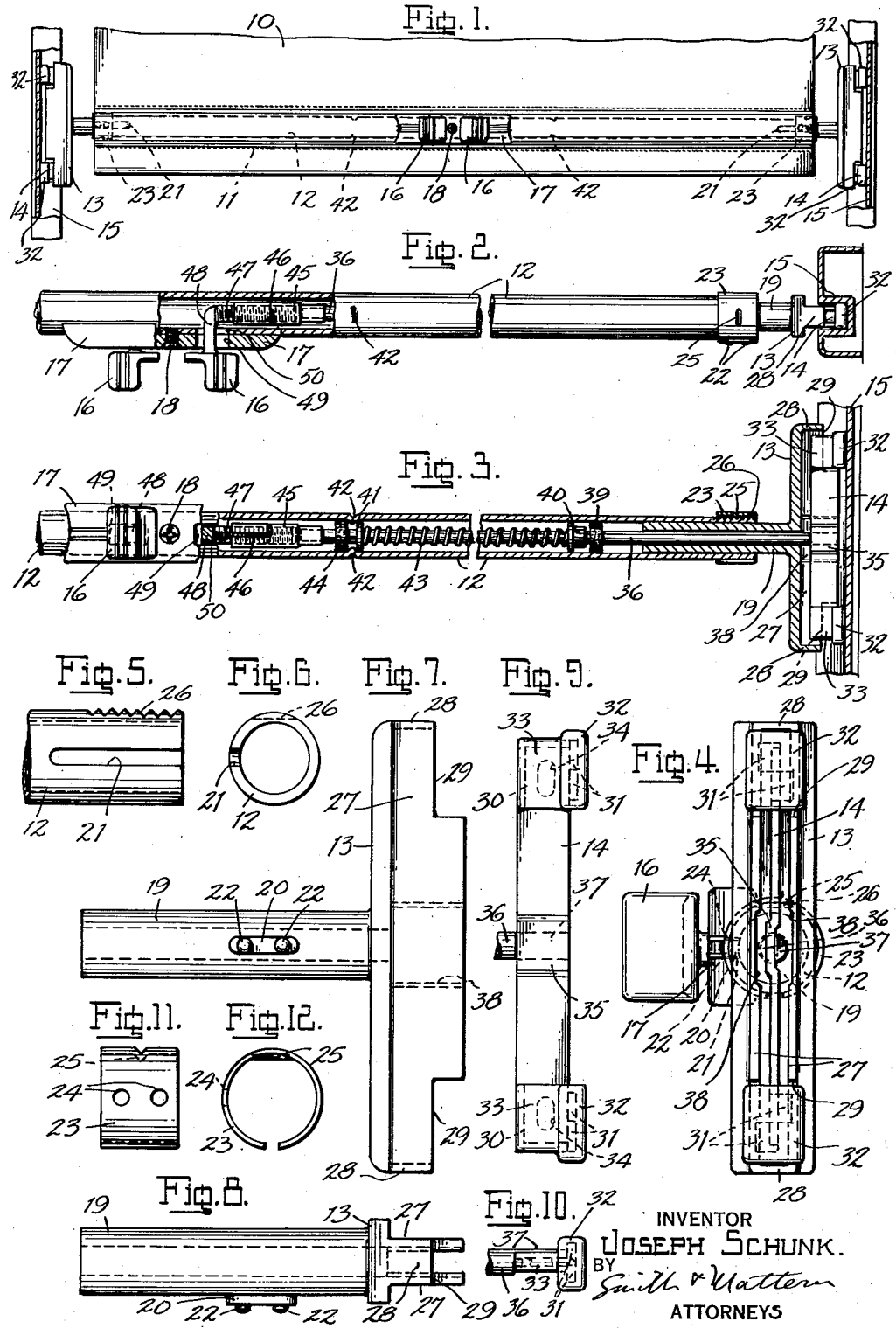
INVENTOR
JOSEPH SCHUNK.
BY
ATTORNEYS Sept. 16, 1941.   J. SCHUNK   2,255,822
CURTAIN FIXTURE
Filed April 16, 1940   3 Sheets-Sheet 2
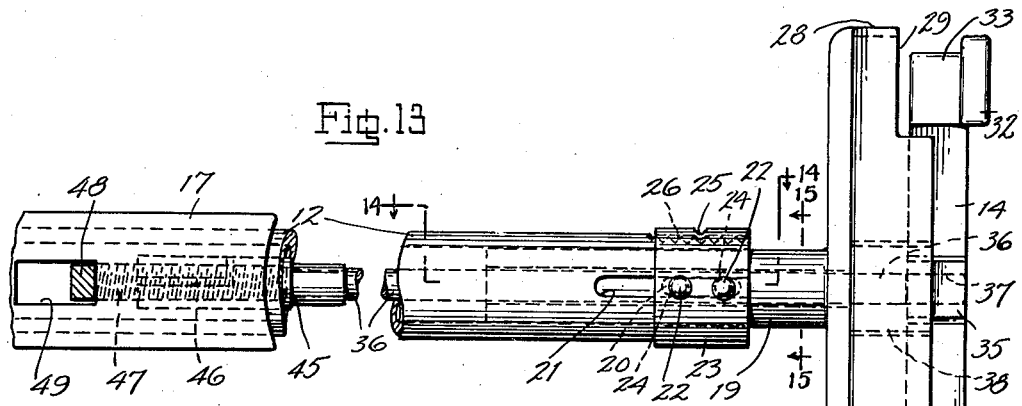
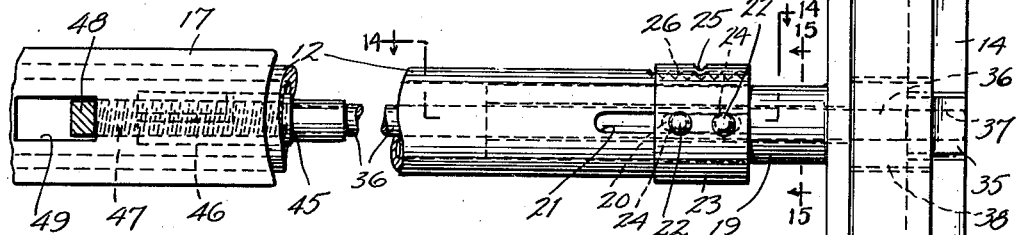
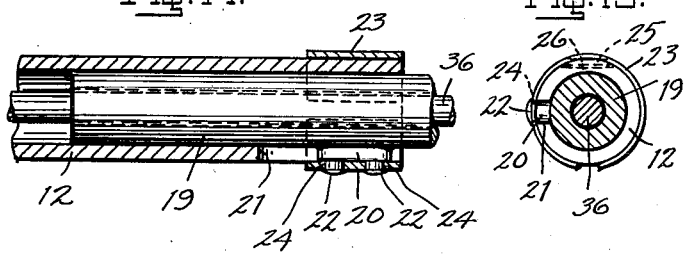
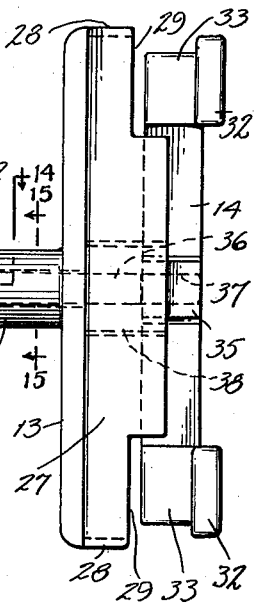
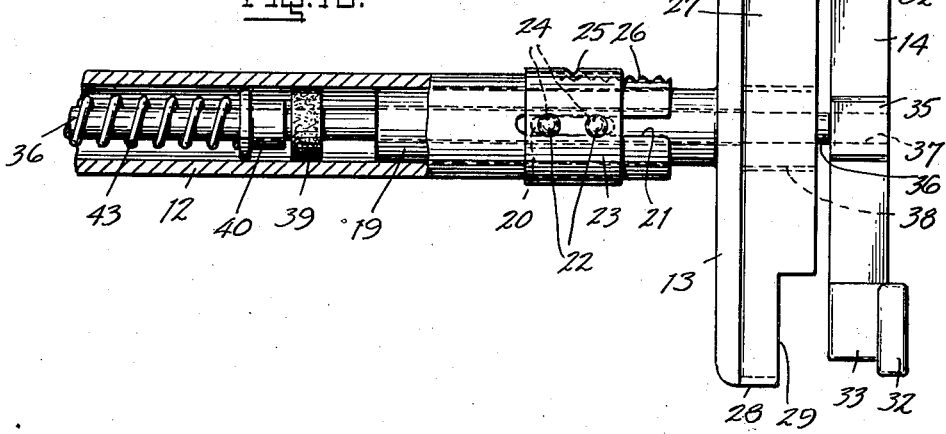
INVENTOR
JOSEPH SCHUNK.
BY
ATTORNEYS Sept. 16, 1941.  J. SCHUNK  2,255,822

CURTAIN FIXTURE

Filed April 16, 1940  3 Sheets-Sheet 3

INVENTOR
JOSEPH SCHUNK
BY
Smith & Mattern
ATTORNEY

Patented Sept. 16, 1941

2,255,822

UNITED STATES PATENT OFFICE 2,255,822

CURTAIN FIXTURE

Joseph Schunk, Newark, N. J., assignor to The National Lock Washer Company, Newark, N. J., a corporation of New Jersey Application April 16, 1940, Serial No. 329,904

11 Claims. (Cl. 156—26)

The present invention relates to improvements in curtain fixtures, particularly of the type used in railway passenger cars, busses and the like, such fixtures being mounted in the lower end of the curtain and provided at each end with a manually retractable spring pressed plunger shoe which operates in a metal channel in each side of the window opening. An objectional feature of such fixtures, as heretofore constructed, is that turning movement has been permitted between the curtain tube and the plunger carrying heads at each end when a rotating motion is applied to the centrally arranged escutcheon or name plate, or the finger pieces carried thereby. This has resulted in a bad appearance being given to the curtain when in use, as it is the habit or the inclination of most people, at times, to catch hold of the curtain where the tube is located and either pull down or shove up, to lower or raise the curtain, instead of catching hold of the finger pieces in the proper manner and pinching them together to overcome the spring pressure against the plunger shoes. The commonly used curtain fixture, under such improper handling, allows the curtain tube to be rotated in relation to the plunger shoes, and brings about a position of the finger-pieces that gives non-uniformity in the appearance of the curtain.

It is an object of the present invention to provide a curtain fixture in which these objectional features are overcome, and to this end it is proposed to provide in the illustrated exemplary embodiment of the invention a plunger carrying head which retains the plunger against turning movement, and connection means between such head and the tube arranged to permit of longitudinal adjustment of the head while at the same time preventing relative rotary movement between the head and the tube.

Another object is to provide improved adjustment means whereby the distance between the heads may be accurately adjusted so as to properly fit the channel to the window opening, and which operation may be performed without the necessity for disassembling or removing any parts. A further object is to provide such adjustment means which will not be effected by pressure upon the plunger shoes carried by the heads, so that there is no possibility of the adjustment being accidentally changed through pressure created through the normal operation of the curtain. A further object is to provide a curtain fixture in which the parts will be reliably supported against rattling and vibration, thus eliminating objectional metallic noise.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a front elevation of the lower end of the curtain, showing the fixture according to the illustrated exemplary embodiment of the invention, the side channels of the window opening being shown partially in vertical section.

Fig. 2 is a top plan view of the central portion and one end portion of the fixture, and showing such end portion engaged in the guide channel at one side, portions of the tube and guide channel being shown in horizontal section.

Fig. 3 is a longitudinal vertical sectional view of the parts, as shown in Fig. 2, a portion of the finger piece carrying escutcheon or name plate being shown in front elevation.

Fig. 4 is an end elevation on an enlarged scale.

Fig. 5 is a side elevation of one end of the tube, also on an enlarged scale.

Fig. 6 is an end view thereof.

Fig. 7 is a side elevation of the head member employed at each end of the fixture.

Fig. 8 is a top plan view thereof.

Fig. 9 is a side elevation of the plunger shoe member employed at each end of the fixture, the pull-rod attached thereto being shown broken away.

Fig. 10 is a top plan view thereof.

Fig. 11 is a side elevation of the detent clip member employed at each end of the fixture.

Fig. 12 is an end view thereof.

Fig. 13 is a side elevation of the central portion and one end portion of the fixture, partially in vertical section, the parts being shown in the relative positions assumed when the head and plunger are disengaged from the guide channel of the window opening.

Fig. 14 is a horizontal sectional plan view, taken along the line 14—14 of Fig. 13.

Fig. 15 is a transverse sectional view, taken along the line 15—15 of Fig. 13.

Fig. 16 is a side elevation, partially in longitudinal vertical section, of one end of the fixture, and showing the head member in its inwardly pushed or retracted position to disengage it from the plunger member, to permit rotation and adjustment of the latter.

Similar reference characters indicate corresponding parts throughout the several figures of the drawings.

Figure 17:
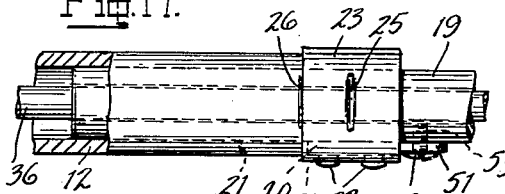
Fig. 17 is a fragmentary plan view of a modification of the invention, in which a modified form of non-rotatable longitudinally-slidable connec

Referring to the drawings, the window curtain 10 has secured in its lower end, by means of a stitched hem portion 11, a curtain fixture according to the invention, the illustrated exemplary embodiment of which consists of a cylindrical tubular rod 12 carrying at each end a head 13 and a spring pressed plunger 14 slidably positioned in the head and engaged with the bottom of the channel guide member 15 of the window opening, the sides of the head being slidably engaged in the channel member and supported thereby against relative turning movement and the plunger adapted to be released from frictional engagement with channel bottom to permit raising and lowering of the curtain through the pinching toward each other of a pair of finger pieces 16—16 mounted in a centrally disposed escutcheon or name-plate 17 secured to the tube 12 by a set-screw 18. Inasmuch as each half of the fixture is a reversed duplication of the other, only one of these will be described in detail.

The head 13 is provided centrally with a rearwardly extending tubular hub or shank portion 19, slidably engaged in the end of the tube 12 and provided with an elongated parallel sided lug 20 slidably engaged in an open ended slot 21 provided in the end of the tube 12, and which permits longitudinal adjustment movement of the head relatively to the tube while preventing relative rotary movement. The lug 20 is provided with a pair of projecting studs 22—22 which are rigidly secured by riveting to a spring clip member 23 mounted upon the end of the tube, and which is provided with a pair of holes 24—24 in which the studs 22—22 are engaged and headed over, the riveted connection between the studs and the clip causing the latter to be longitudinally moved relatively to the tube, as the head is longitudinally moved, and as will hereinafter more fully appear.

The clip member is in the form of a cylindrical split spring band, preferably having the split at the bottom, and diametrically opposite to the split there is provided a transverse detent tooth 25, impressed downwardly in the clip, and which is engaged in one of a series of transverse grooves 26 provided in the end of the tube 12. The springiness of the clip is such that the detent tooth will slide out of one groove and into the next when sufficient longitudinal pressure is applied to the head 13, but the holding effect of the detent is normally sufficient to retain the head in its operative adjusted relation with respect to the tube.

The head 13 is of vertically elongated rectangular shape, and is provided with outwardly projecting side walls 27—27 and top and bottom walls 28—28, which are relatively narrower than the head so as to slidably engage within the channel member 15, and to provide a pocket for the plunger 14, the inner edges of the side and top walls being angularly recessed at the upper and lower ends as at 29—29 to form recesses in which the upper and lower shoe tip ends of the plunger are disposed.

The plunger 14 is preferably formed of a strip of sheet metal and is provided at each of its upper and lower ends with a narrow shouldered portion 30 having upon its forward edge a pair of oppositely bent transversely projecting lugs 31 forming an anchoring frame structure upon which is moulded the transversely disposed rubber tip member 32 having the right angular extension portion 33, an aperture 34 being provided in the end 30 in which the rubber is interlockingly moulded. These tips which are of relatively soft rubber are identical in form at each end of the strip and at each end of the fixture and are therefore interchangeable with each other when reversed or rotated in their operative positions in the fixture. At its central portion the strip 14 is provided with a laterally offset rod attaching portion 35, the inner surface of which is disposed in the central plane of the strip, and the pull rod 36 is rigidly secured to this portion, being ground off at the end to provide a semi-circular cross-section shouldered end portion 37 which engages the inner surface of the offset portion 35 and is rigidly secured thereto, preferably by welding, although it may be riveted or otherwise suitably secured, as desired. This connection between the pull rod and the plunger disposes the axis of the pull rod in the central plane of the plunger, so that when rotated 180° the plunger will be disposed in the same relative position in the head. The inner surface of each of the walls 14 of the head is recessed, as at 38, to provide clearance for the pull rod end 37 and the plunger offset 35.

The pull rod 36, which is slidably and rotatably engaged in the passage of the hub or shank 19 of the head, is provided contiguous to the inner end of the shank with a felt washer 39, snugly engaging the tube 12 so as to prevent rattling and metallic noise between the rod and tube, and inwardly adjacent this washer 39 a flanged collar 40 is secured upon the rod, preferably by welding. A pull rod washer 41 is slidably engaged upon the pull rod and its position is fixed in the tube 12 through abutment with lugs 42—42 pressed into the tube, a helical spring 43 being provided upon the rod between the washer 41 and the collar 40 which exerts projecting pressure upon the pull rod and the plunger. A felt washer 44 is provided upon the rod between the lugs 42 and the inner end of the rod, and is snugly engaged in the tube 12 to cooperate with the felt washer 39 to insulate the rod and tube against rattling and metallic noise.

Upon the inner end of the rod there is rigidly secured, preferably by welding, an interiorly threaded sleeve socket 45 provided with an angular slot 46 extending from its outer end to its intermediate portion, for the purpose of imparting a slight resiliency to the socket sleeve so that it is normally held against free turning with respect to the threaded shaft extension 47 of the finger piece 16 with which it is engaged. The finger piece 16 is provided with a reduced shank portion 48 slidably engaged in the rectangular slot 49 of the plate 17 and the correspondingly shaped slot 50 in the tube 12 registering therewith, the finger piece 16, its shank 48, and the threaded shaft 47 being preferably integrally formed.

In assembling the plunger parts the pull-rod 36, which has first been rigidly secured by welding to the plunger 14, is engaged through the passage of the hub or shank 19 of the head 13, the felt washer 39, the collar 40, the spring 43, the pull-rod washer 41, the felt washer 44, and the threaded sleeve socket 45 are engaged upon the pull-rod 36, and the collar 40 and socket 45 are secured by welding. The spring clip 23 is pressed upon the end of the tube and the assembled head, plunger, and pull-rod parts are thereupon fitted into the tube 12, the lug 20 of the head being engaged in the slot 21 of the tube, and the threaded sleeve socket 45 being screwed upon the threaded shaft 47 of the finger piece, which has been first inserted through the slots 49 and 50, by rotating the plunger 14 and the pull rod connected thereto, while the head 13 is in a retracted position out of engagement with the plunger, as shown in Fig. 16.

The head is thereupon moved to its projected position as shown in Fig. 13, the clip 23 being carried with it and detenting in the groove 26. As shown in Fig. 13 the projection of the plunger relative to the head is limited by the engagement of the finger piece shank 48 with the outer end of the slot 49. When engaged in the window opening channel 15 the plunger is retracted from this position, so that the shank of the finger piece is intermediate the ends of the slot 49 and the plunger is engaged with the bottom of the channel 15 under constant spring pressure. In the normal operative position, as shown in Fig. 2, the distance between the shank 48 of the finger piece and the inner end of the slot 49 is less than the distance between the inner edge of the plunger strip 14 and the base of the pocket in the plunger head 13, so that when the finger pieces are pinched together to withdraw the plungers 14 from engagement with the bottoms of the channel strips the movement of the plungers will be limited, so that they will be prevented from exerting pressure upon the heads 13, which might tend to disturb their position of adjustment with respect to the ends of the tube 12.

The operation is as follows:

As shown in Figs. 1 to 3, the fixture is in its normal operative position with the plunger at each end spring pressed into engagement with the bottom of the channel strip 15 so that the curtain is frictionally retained in its adjusted position. In order to raise or lower the curtain the finger pieces 16 are pinched toward each other thereby retracting the plungers and allowing the fixture to ride freely at its ends in the channel strips. In the event that the finger pieces or the lower end of the curtain is gripped in such way as to tend to turn the fixture the heads 13, which engage within the channel strips, will be prevented from turning and through the interlocking relation of the lugs 20 with the slots 21 the tubing will be prevented from rotating and the finger pieces will therefore remain in their proper position. While the heads are thus locked against rotary movement they are at the same time longitudinally adjustable, and the spring pressed plungers may be rotated to adjust the length of the rods 36 with respect to the finger pieces, so as to effect a proper adjustment of the fixture to fit window openings of varying width. In order to bring about this adjustment the heads are disengaged from the channel strips, which allows the plungers to project to the position shown in Fig. 13, which is limited through abutment of the finger piece shank 48 with the outer end of the slot 49. The head 13 is thereupon pressed inwardly with respect to the end of the tube 12, carrying the detent spring band 23 with it to the position as indicated in Fig. 16, when the plunger 14 is free of the head 13. With the parts in this position the plunger 14 may be rotated to change the distance between it and the finger piece by screwing the sleeve socket 45 inwardly or outwardly upon the threaded shaft 47. When this adjustment is made and it is determined that the plungers will properly engage the bottoms of the channel strips under the desired pressure the head members 13 are projected so that they engage over the plungers and fit within the channels 15, and this position may be varied as desired, the detent spring band 23 being engaged with the desired groove 26 to retain the adjusted position of the head.

In Figs. 17 to 28 I have shown several modifications of the invention in which releasable means are provided for positively locking the fixture head 13 with respect to the curtain fixture tube 12, such means normally preventing relative rotary movement between the head and tube and when released permitting longitudinal retraction of the fixture head.

Figure 18:
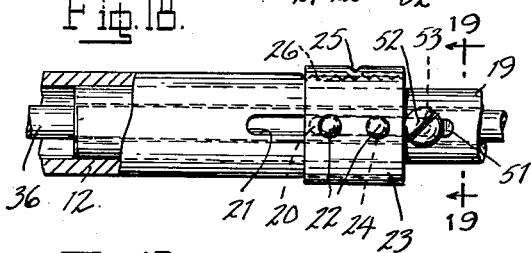
- Fig. 18 is a side elevation thereof.
Figure 19:
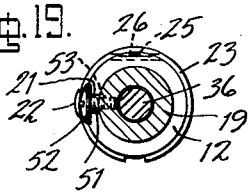
Fig. 19 is a transverse sectional view, taken along the line 19—19 of Fig. 18.

In Figs. 17 to 19 the lug 20 is provided with a longitudinally aligned extension 51 normally projected beyond the end of the tube 12 and having its surface slightly below the outer periphery of the tube. A set screw 52 is screwed into a tapped hole 53 in the lug extension 51, and in the normal locked position the head of this screw is below the outer periphery of the tube and therefore prevents accidental retraction of the fixture head when the fixture is improperly used and excessive retracting pressure is exerted upon the fixture head. In order to permit retraction of the fixture head the set screw is released by turning the head beyond the outer periphery of the tube. In this position the fixture head may be retracted, the screw head passing over the outside of the tube, and the screw shank which is smaller than the slot 21 passing into the slot with the lug extension 51. Should it be desired to fix the position of the fixture head at an intermediate point the screw may be tightened, to bring the head into clamping engagement with the surface of the tube at each side of the slot 21.

Figure 20:
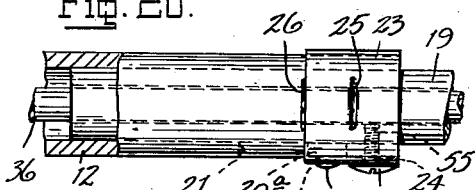
Fig. 20 is a plan view of another modified form of non-rotatable longitudinally-slidable connection means.
Figure 21:
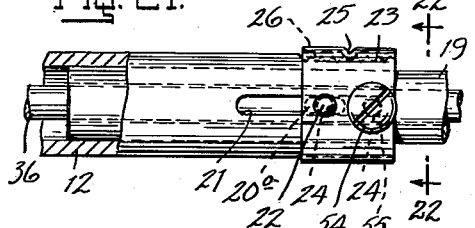
Fig. 21 is a side elevation thereof.
Figure 22:
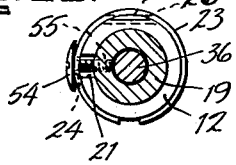
Fig. 22 is a transverse sectional view, taken along the line 22—22 of Fig. 21.

In Figs. 20 to 22, I have shown a modification in which a set screw 54 is engaged through one of the rivet holes 24 in the spring clip 23 and is screwed in a tapped hole 55 in the hub 19 of the fixture head. In this form the lug 20ᵃ is shorter than the lug 20 of the first embodiment and the spring clip is secured thereto by a single rivet stud 22. By tightening this screw the screw head clamps the spring clip member 23 against the surface of the tube at each side of the slot 21 thereby positively locking the clamping head with respect thereto. Upon loosening the screw the fixture head may be retracted in a similar manner to the retraction of the fixture shown in the first embodiment.

Figure 23:
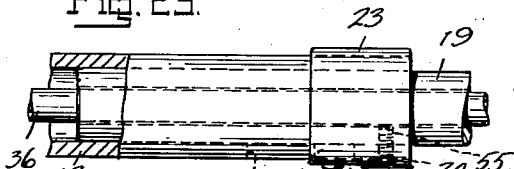
Fig. 23 is a fragmentary plan view of still another modified form of non-rotatable longitudinally-slidable connection means.
Figure 24:
Fig. 24 is a side elevation thereof.
Figure 25:
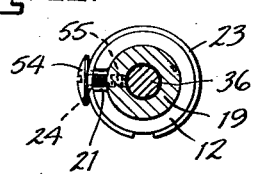
Fig. 25 is a transverse sectional view, taken along the line 25—25 of Fig. 24.

In Figs. 23 to 25 I have shown a modification, substantially similar to the modification shown in Figs. 20 to 22, except that in this case the tube is not provided with the detent grooves 26 and the spring clip is not provided with a detent tooth 25. Upon releasing the set screw the fixture head may be retracted and the spring clip will function to frictionally retain the fixture head in retracted position.

Figure 26:
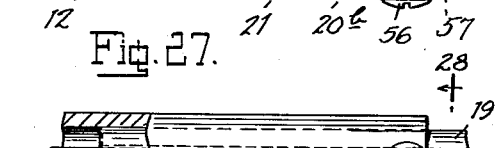
Fig. 26 is a fragmentary plan view of still another modified form of non-rotatable longitudinally-slidable connection means.
Figure 27:
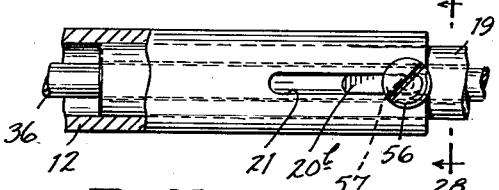
Fig. 27 is a side elevation thereof.
Figure 28:
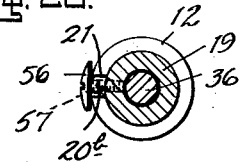
Fig. 28 is a transverse sectional view, taken along the line 28—28 of Fig. 27.

In Figs. 26 to 28 I have shown a modification in which the spring clip is dispensed with. In this case the fixture head hub 19 is provided with a lug 20ᵇ slidably engaged for longitudinal movement in the slot 21, and a set screw 56 is provided in a tapped hole 57 in the lug 20ᵇ. In the locked position this set screw is tightened down so that the screw-head clampingly engages the tube at each side of the slot. In the released position the fixture is free to have retracting movement, the engagement of the lug 20ᵇ in the slot 21 preventing relative rotary movement.

I have illustrated and described a preferred and satisfactory embodiment of the invention, but it will be understood that changes may be made therein, within the spirit and scope thereof, as defined in the appended claims.

Having thus described my invention, what I claim and desire to secure by Letters Patent is:

1. In a curtain fixture, a tube, a head member slidably keyed upon the end of said tube for longitudinal adjustable movement, yieldable detent means cooperatively arranged between said head and said tube to yieldably retain said head in longitudinally adjusted position, a spring pressed plunger rod carried by said tube, and a plunger carried by said rod.

2. In a curtain fixture, a tube, a head member slidably keyed upon the end of said tube for longitudinal adjustment movement, a spring pressed plunger rod carried by said tube, and a plunger carried by said rod, said head adapted in a projected position to be non-rotatably related to said plunger and in a retracted position to permit relative rotation of said plunger.

3. In a curtain fixture, a tube, a head member mounted upon the end of said tube for longitudinal adjustment movement, means cooperatively arranged between said head and said tube to prevent relative rotary movement between said head and said tube, a spring pressed plunger rod carried by said tube, and a plunger carried by said rod.

4. In a curtain fixture, a tube, a head member mounted upon the end of said tube for longitudinal adjustment movement and having a tubular shank slidably engaged within the end of said tube, a projecting lug carried by said shank, said tube having a longitudinal slot engaged by said lug to prevent relative rotation between said head and said tube, yieldable detent means cooperatively arranged between said head and said tube to yieldably retain said head in longitudinally adjusted position, a spring pressed plunger rod carried by said tube and extending through said tubular shank, and a plunger head carried by said rod.

5. In a curtain fixture, a tube, a head member mounted upon the end of said tube for longitudinal adjustment movement and having a tubular shank slidably engaged within the end of said tube, a projecting lug carried by said shank, said tube having a longitudinal slot engaged by said lug to prevent relative rotation between said head and said tube, a split spring band connected to said head yieldably surrounding said tube, a detent projection in said band, said tube having a series of detent grooves engageable by said projection to yieldably retain the longitudinally adjusted position of said head, a spring pressed plunger rod carried by said tube and extending through said tubular shank, and a plunger head carried by said rod.

6. In a curtain fixture, a tube, a head member mounted upon the end of said tube for longitudinal adjustment movement, means cooperatively arranged between said head and said tube to prevent relative rotary movement between said head and said tube, said head extending transversely of the axis of said tube and having a pocket therein, a spring pressed plunger rod carried by said tube, and a plunger carried by said rod and normally disposed in said pocket of said head, said head adapted through longitudinal movement relative to said tube to be disengaged from said plunger to permit rotation of said plunger relative to said tube.

7. In a curtain fixture, a tube, a head member slidably keyed upon the end of said tube for longitudinal adjustment movement, a spring pressed plunger rod carried by said tube, and a plunger carried by said rod, said head adapted in a projected position to be non-rotatably related to said plunger and in a retracted position to permit relative rotation of said plunger, a finger piece carried by said tube, and threaded connection means between said finger piece and said rod adapted to be longitudinally adjusted through rotation of said rod, said tube having a slot engaged by said finger piece to limit its longitudinal movement.

8. In a curtain fixture, a tube, a head member mounted upon the end of said tube for longitudinal adjustment movement, means cooperatively arranged between said head and said tube to prevent relative rotary movement between said head and said tube, said head extending transversely of the axis of said tube and having a pocket therein, a spring pressed plunger rod carried by said tube, a plunger carried by said rod and normally disposed in said pocket of said head, said head adapted through longitudinal movement relative to said tube to be disengaged from said plunger to permit rotation of said plunger relative to said tube, a finger piece carried by said tube, and threaded connection means between said finger piece and said rod adapted to be longitudinally adjusted through rotation of said rod, said tube having a slot engaged by said finger piece to limit its longitudinal movement.

9. In a curtain fixture, a tube, a head member mounted upon the end of said tube for longitudinal adjustment movement, means cooperatively arranged between said head and said tube to prevent relative rotary movement between said head and said tube, said head extending transversely of the axis of said tube and having a pocket therein and having recesses at the upper and lower ends of said pocket, a spring pressed plunger rod carried by said tube, a plunger carried by said rod and normally disposed in said pocket of said head, and having projecting cushion tip members secured upon its ends and disposed in said recesses, said head adapted through longitudinal movement relative to said tube to be disengaged from said plunger to permit rotation of said plunger relative to said tube.

10. In a curtain fixture, a tube, a head member slidably keyed upon the end of said tube for longitudinal adjustment movement, releasable locking means arranged to lock the longitudinal position of said head member relative to said tube, a spring pressed plunger rod carried by said tube, and a plunger carried by said rod.

11. In a curtain fixture, a tube, a head member slidably keyed upon the end of said tube for longitudinal adjustment movement, yieldable detent means cooperatively arranged between said head and said tube to yieldably retain said head in longitudinally adjusted position, releasable locking means arranged to lock the longitudinal position of said head member relative to said tube, a spring pressed plunger rod carried by said tube, and a plunger carried by said rod.

JOSEPH SCHUNK.